United States Patent [19]

Paugh, Jr. et al.

[11] Patent Number: 4,799,861
[45] Date of Patent: Jan. 24, 1989

[54] PUMP

[75] Inventors: James J. Paugh, Jr., Palmer; Charles J. Hinckley, Ware, both of Mass.

[73] Assignee: Warren Pumps, Inc., Warren, Mass.

[21] Appl. No.: 114,818

[22] Filed: Oct. 29, 1987

[51] Int. Cl.[4] .............................................. F04D 29/28
[52] U.S. Cl. ........................... 416/186 R; 416/213 A; 228/138
[58] Field of Search ........... 416/213 A, 213 R, 186 R, 416/187; 228/138, 139, 165, 182; 29/156.8 CF, 156.8 T

[56] References Cited

U.S. PATENT DOCUMENTS

| | | | |
|---|---|---|---|
| 1,600,690 | 9/1926 | Meyer | 416/186 R |
| 1,600,708 | 9/1926 | Baumann | 416/186 R |
| 1,825,622 | 9/1931 | Kennedy | 416/186 R |
| 2,336,749 | 12/1943 | Ratkowski | 228/182 X |
| 2,366,251 | 1/1945 | Füllemann | 416/186 R |
| 2,395,704 | 2/1946 | Wislicenus | 416/186 R |
| 2,654,943 | 10/1953 | Campbell | 29/156.8 CF |
| 2,796,836 | 6/1957 | Büchi | 416/186 R |
| 3,159,106 | 12/1964 | Schumbacker et al. | 416/186 R |
| 3,285,187 | 11/1966 | Anderson | 416/186 R |
| 4,288,677 | 9/1981 | Sakata et al. | 416/213 R X |

FOREIGN PATENT DOCUMENTS

| | | | |
|---|---|---|---|
| 2622823 | 12/1976 | Fed. Rep. of Germany | 416/186 R |
| 2312671 | 12/1976 | France | 416/186 R |
| 112750 | 1/1918 | United Kingdom | 228/139 |
| 813133 | 5/1959 | United Kingdom | 416/186 R |

Primary Examiner—Everette A. Powell, Jr.
Attorney, Agent, or Firm—Blodgett & Blodgett

[57] ABSTRACT

Pump having an impeller with accurately formed radial passages and the method for making it.

1 Claim, 5 Drawing Sheets

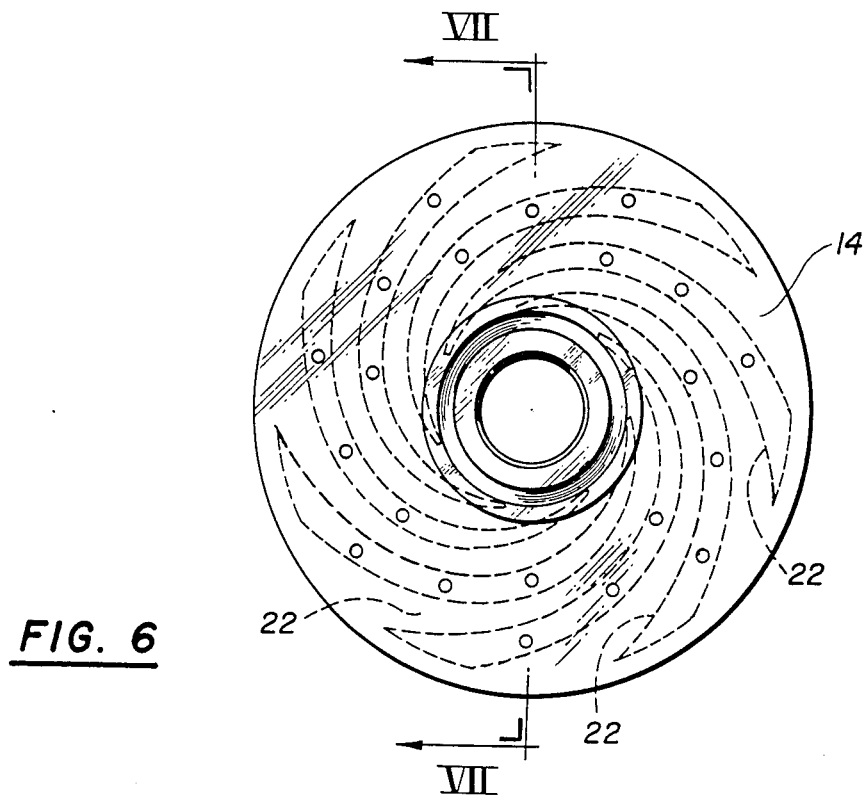
FIG. 6
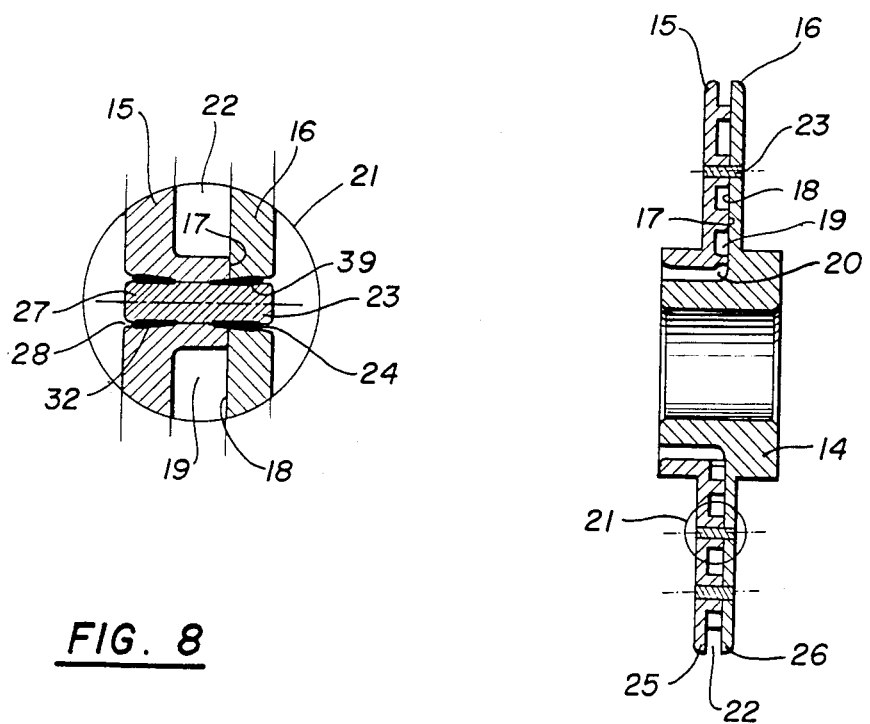
FIG. 8
FIG. 7

PUMP

BACKGROUND OF THE INVENTION

There are many instances in the design and manufacture of machinery in which it is important to assemble two parts together very accurately and permanently. Nowhere is this more important than in the manufacture of a centrifugal pump where the impeller is designed with internal passages. These passages must be exactly alike, otherwise an "odd" passage can cause pulsations in the hydraulic pressure. These pulsations appear in the entire system to which the pump is connected and are almost always undesirable.

Now, in attempting to remove differences in the shapes and sizes of the passages, impellers have been made in two parts which are half of each passage in each half. This permits the half passages to be carefully machined. This would, of course, not be possible if the impeller were made in one piece, because of the curved shape of the passages. The two halves were joined together by rivets or threaded fasteners after the machinery operation. However, no matter what type of means was used to join the two parts, it was impossible to match the machined cavities to provide a smooth continuous passage. Furthermore, all fastening means tended to loosen and thus destroy the integrity of the impeller. These and other difficulties experienced with the prior art devices have been obviated by the present invention in a novel manner.

It is, therefore, an outstanding object of the invention to provide a centrifugal pump capable of delivering hydraulic pressure without pulsations.

Another object of this invention is the provision of method of producing a centrifugal pump impeller with multiple internal passages that are accurately similar in shape and size.

A further object of the present invention is the provision of method of joining two members of a machinery part in such a manner that they are permanently joined in accurate relationship with one another.

It is another object of the instant invention to provide a centrifugal pump impeller which is simple in construction, which is inexpensive to manufacture, and which is capable of a long life of useful service with a minimum of maintenance.

With these and other objects in view, as will be apparent to those skilled in the art, the invention resides in the combination of parts set forth in the specification and covered by the claims appended hereto.

SUMMARY OF THE INVENTION

In general, the invention relates to a pump having a housing formed with a chamber, a spindle extending through the chamber and mounted for rotation in bearings, and an impeller mounted on the spindle for rotation therewith. The impeller consists of two parts having facing surfaces, the surfaces being accurately formed with open channels and the two parts being connected by a joint, so that the said channels combine to form passages. The joint is formed by pegs extending through bores in the two parts.

More specifically, the invention includes a method of forming an accurate internal passage in a pump element, including the steps of forming the element in two parts having accurately-formed channels in facing surfaces, providing congruent pairs of bores through the two parts, inserting a beveled peg through each congruent pair of bores to form an annular groove between each bore and a corresponding end of the respective bore, and forming a weld in the said groove by use of an electron beam.

BRIEF DESCRIPTION OF THE DRAWINGS

The character of the invention, however, may be best understood by reference to one of its structural forms, as illustrated by the accompanying drawings, in which:

FIG. 6 is an elevational view of a pump impeller taken on the line VI—VI of FIG. 5, FIG. 7 is a sectional view of the impeller taken on the line VII—VII of FIG. 6, FIG. 8 is an enlarged sectional view of the impeller taken from a portion of FIG. 7.

DESCRIPTION OF THE PREFERRED EMBODIMENT

Figure 1:
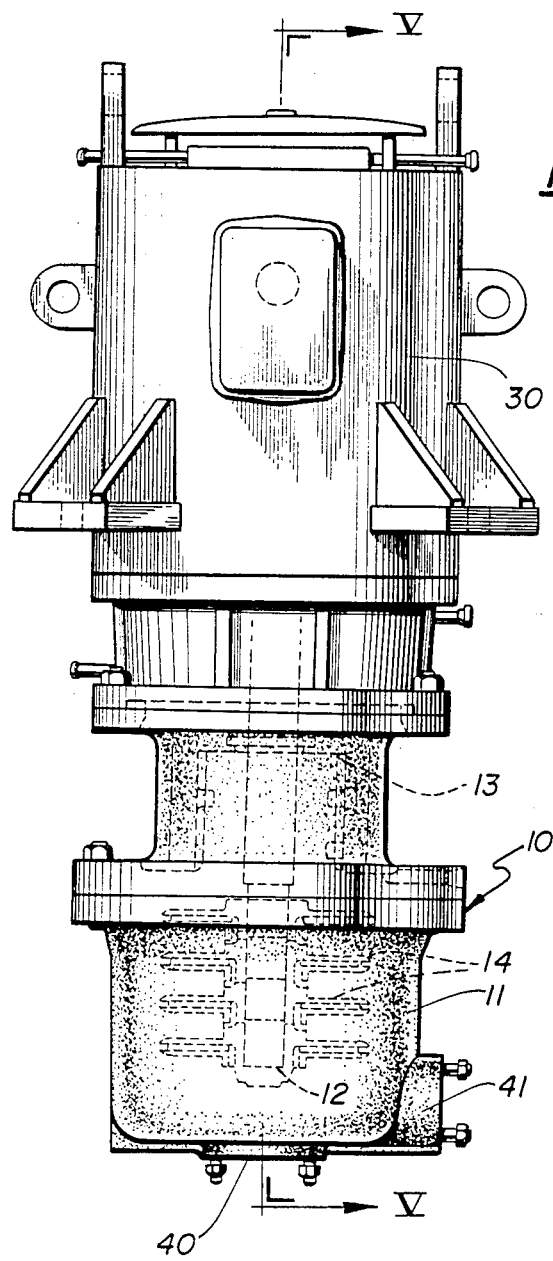
FIG. 1 is a front elevational view of a pump incorporating two principles of the present invention.
Figure 2:
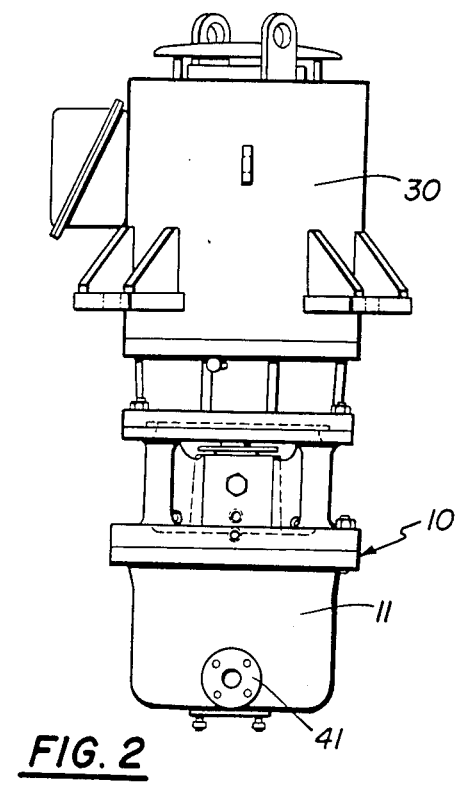
FIG. 2 is a side elevational view of the pump.
Figure 3:
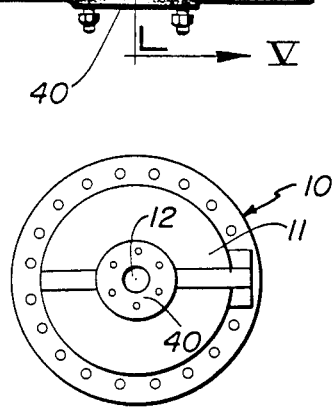
FIG. 3 is a bottom plan view of the pump.
Figure 4:
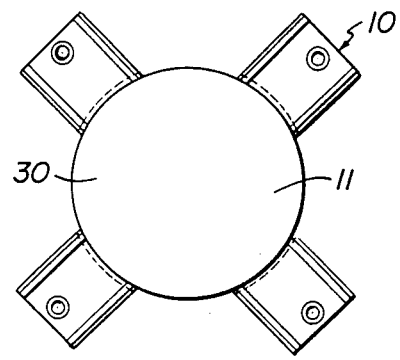
FIG. 4 is a top plan view of the pump.

Referring first to FIGS. 1-5, wherein are best shown the general features of the invention, the pump, indicated generally by the reference numeral 10, is shown as having a housing 11 which is attached a drive motor 30. The housing has an internal chamber 29 (see FIG. 5) through which passes a spindle 12. The spindle is mounted in bearings 13 and is driven by the motor 30.

Figure 5:
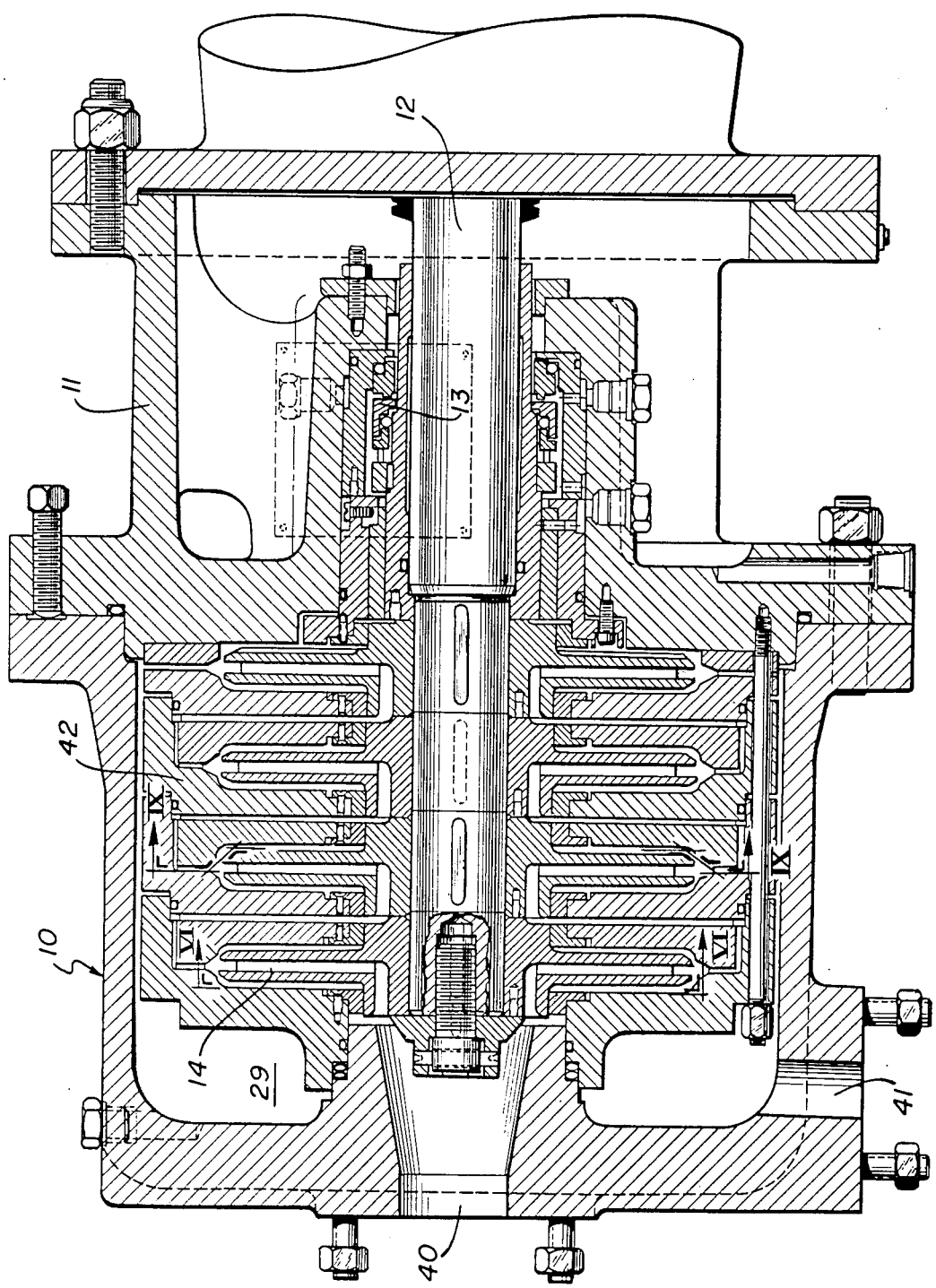
FIG. 5 is a vertical-sectional view rotated 90° of the pump taken on the line V—V of FIG. 1.

In FIG. 5, it can be seen that the spindle 12 has mounted on it a plurality of impellers 14 which revolve with the spindle within channel rings 42. The housing 11 is provided with an inlet opening 40 in alignment with the spindle 12 and with an outlet opening 41, these being connected in the usual way into a hydraulic system, not shown.

FIGS. 6 and 7 show the details of one of the impellers 14 which is shown as consisting of a first part 15 and a second part 16 which are joined by a joint 21. The first part 15 is provided with a finely-finished surface 17, while the second part 16 is similarly provided with a finely-finished surface 18. The first part 15 is formed with channels 19 whose general shape is shown as spiral in nature in FIG. 6. The second part 16 is provided with channels 20 which extend more or less radially as an annulus that joins all of the other channels. The first and second part of the impeller 14 are joined together permanently and accurately, so that the channels 19 and 20 combine to form very accurately formed passages 22 which are very much alike in shape and size.

Referring to FIG. 8, the joint 23 can be seen as consisting of a peg 23 which resides in bores 38 and 39 passing axially through the first part 15 and the second part 16, respectively. The peg 23 is beveled adjacent its ends where it lies in the bores 38 and 39 to form a more or less triangular groove 28 at the entrance of the bores to their outer surface. This groove is filled with a weld 24 provided by use of an electron beam as will be described further herein after.

The pegs 23 and the bores 38 and 39 are finally finished provide a close fit. It is evident from the drawings that the two parts 15 and 16 of the impeller are generally disk-like in shape with peripheries 25 and 26 which are coaxial of the axis of the spindle 12. Bores extend axially through the two parts and each peg extends completely through a bore in one part and a congruent bore in the other part. The end of each peg is provided with a bevel 27 which lies in the outer entrance of both bores to define an annular groove of triangular cross-section between the peg and the bore at the said entrance. The weld 24, therefore, holds the parts firmly together in accurate placement.

The advantages of the present invention will now be evident from the above description. The formation of the impeller with very accurate passages 22 means that the hydraulic pressure produce at the periphery of the impeller and carried eventually to the outlet 41 in the housing of the pump will be free from pressure irregularities. Therefore, the hydraulic system to which the pump is attached will be free of pressure pulses and fluid-borne noise.

Figure 9:
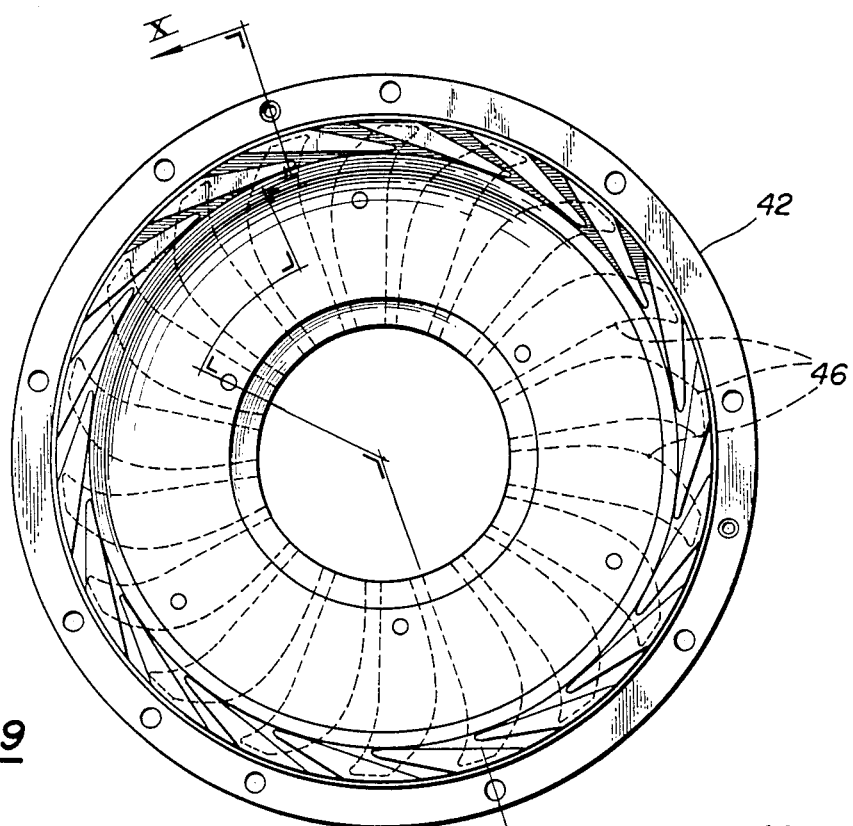
FIG. 9 is an elevational view of a pump channel ring taken on the line IX—IX of FIG. 5.
Figure 11:
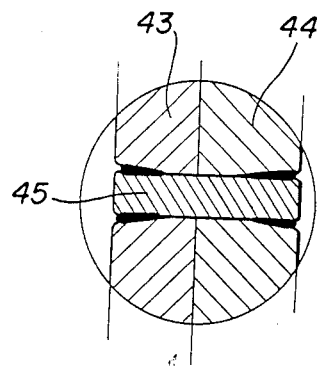
FIG. 11 is an enlargement of a portion of FIG. 10.
Figure 10:
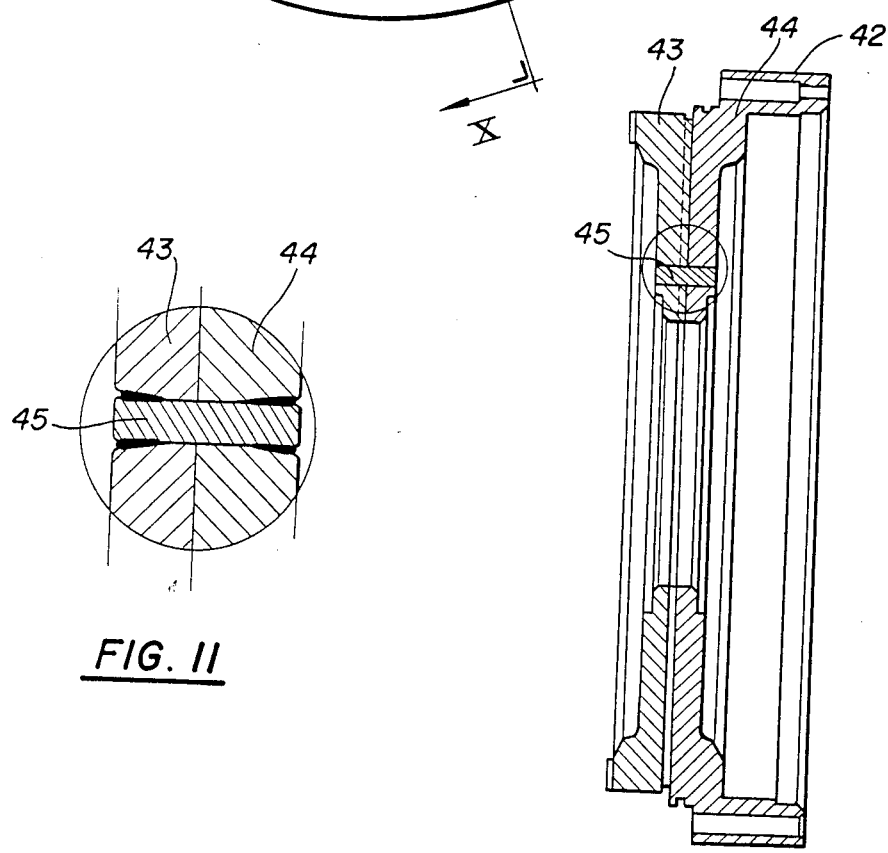
FIG. 10 is a sectional view of the channel ring taken on the line X—X of FIG. 9.

FIGS. 9, 10, and 11 show how another important part of the pump is in a similar way made up of two parts. The channel ring 42 is provided by joining a first part 43 and a second part 44, making use of the pegs 45 in the same way that has been described in the connection with the impeller shown in FIG. 6. Two parts are provided with mating finally-finished surfaces which are permanently, tightly, and accurately held together by the use of the pins 45 operating in accurately and finally-finished bores means that passages making up the parts of the diffuser or channel ring 42 of very permanently and accurately-located one another to provide suitable hydraulic passages 46 and assist in preventing fluid-borne noise.

Figure 12:
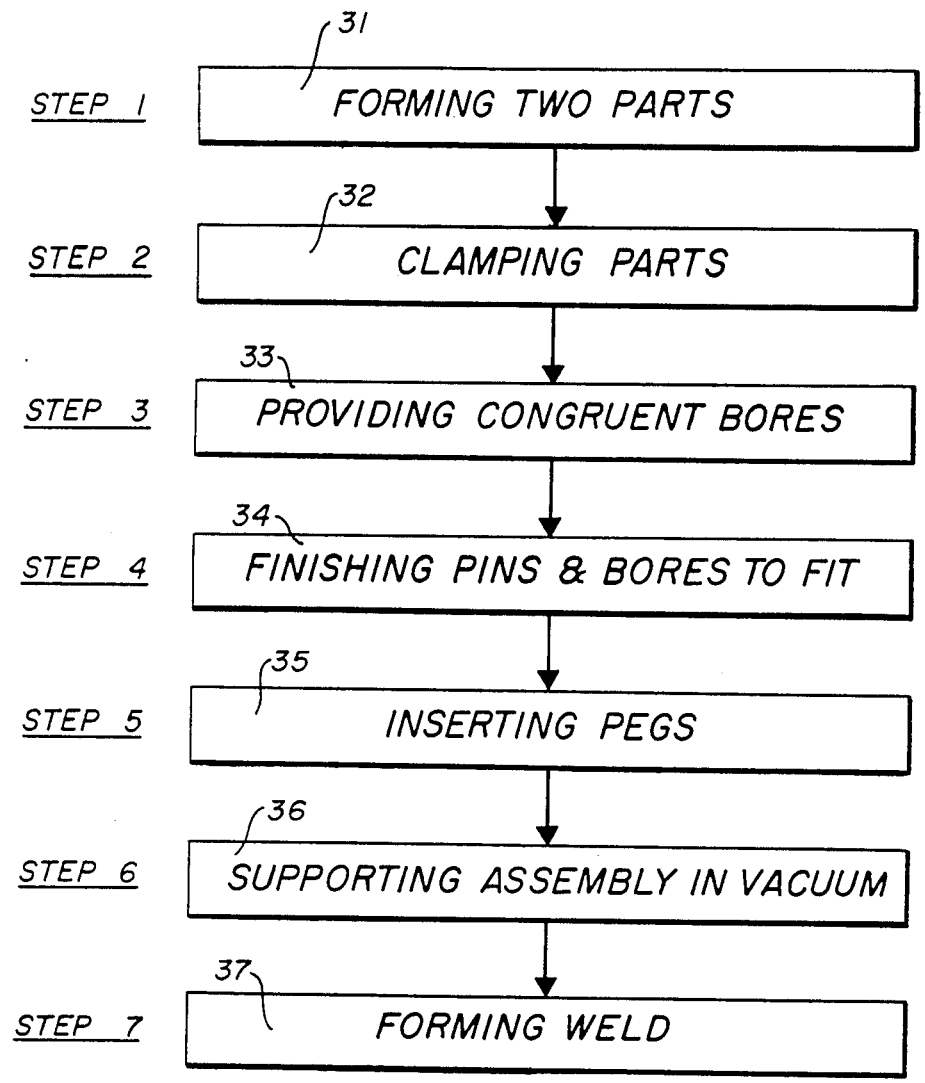
FIG. 12 is a flow chart showing a method of forming the impeller and the channel ring.

FIG. 12 shows the steps of the method by which the two parts of the impeller and the two parts of the channel rings are accurately joined together. The first step 31 consists in forming the two parts of the pump element. The second step 32 consists of clamping the parts together with accurately-formed channels in facing surfaces. Each channel will form the passages in the finished product. Step three consists, while the parts are clamped together, of providing congruent bores which extend through the two parts. The fourth step 34 consists of finishing the pins and the bores to fit. The fifth step 35 consists of inserting the pegs in the bores which, because each peg is tapered at its ends, forms with the bores an annular groove at the ends. The sixth step 36 consists of supporting the assembly in a vacuum chamber and in the seventh step 37 of forming a weld in the groove by use of an electron beam.

The two parts are rigidly clamped together so that the accurately-formed channels in facing surfaces are accurately related and the congruent bores are then formed to maintain symmetry of channels. The weld is formed from the metal of the peg and the bore without the use of filler metal. The welding takes place with the axes of the pins vertical and the electron beam extending downwardly in a vertical direction. In the preferred embodiment, the pins and bores are finished to give a "clearance locational fit" in accordance with ANSI Standard Fit Class LC2 or better.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. Pump comprising:
  (a) a housing having a chamber,
  (b) a spindle extending through the chamber, and mounted for rotation in bearings,
  (c) an impeller mounted on the spindle for rotation therewith, the impeller consisting of two parts having facing surfaces, wherein the two parts are of generally disk-like shape with peripheries that are coaxial of the said spindle, the surfaces being accurately formed with open channels, the two parts being connected by a joint, so that the said channels combine to form passages, and
  (d) pegs extending through bores in the two parts to form the said joint, wherein the pegs and bores are accurately formed to provide a close fit, wherein the pegs are joined by an electron beam weld in the said bores, wherein the bores are formed in both of the said parts, so that the parts are accurately located relative to one another, wherein the bores extend axially through the two parts, wherein each peg extends completely through a bore in one part and a congruent bore in the other part, wherein the ends of each peg are provided with bevels which lie in the outer entrance of both bores to define an annular groove of triangular cross-section between the peg and the bore at the said entrance, and wherein the electron beam weld is located in the said groove.

* * * * *